United States Patent
Sakala et al.

(10) Patent No.: US 10,677,090 B2
(45) Date of Patent: Jun. 9, 2020

(54) COMPONENT HAVING CO-BONDED COMPOSITE AND METAL RINGS AND METHOD OF ASSEMBLING SAME

(71) Applicant: General Electric Company, Schenectady, NY (US)

(72) Inventors: Viswanadha Gupta Sakala, Karnataka (IN); Wendy Wenling Lin, Montgomery, OH (US); Raghuveer Chinta, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 445 days.

(21) Appl. No.: 15/591,275

(22) Filed: May 10, 2017

(65) Prior Publication Data
US 2018/0328176 A1 Nov. 15, 2018

(51) Int. Cl.
*F01D 25/00* (2006.01)
*F02C 7/04* (2006.01)
(Continued)

(52) U.S. Cl.
CPC .......... *F01D 25/005* (2013.01); *F01D 5/147* (2013.01); *F01D 5/28* (2013.01); *F01D 5/282* (2013.01); *F02C 7/04* (2013.01); *F05D 2220/32* (2013.01); *F05D 2230/23* (2013.01); *F05D 2240/20* (2013.01); *F05D 2240/35* (2013.01); *F05D 2300/10* (2013.01); *F05D 2300/2102* (2013.01);
(Continued)

(58) Field of Classification Search
CPC . F01D 5/02; F01D 5/147; F01D 5/282; F01D 5/28; F04D 29/321; F02C 7/04
See application file for complete search history.

(56) References Cited

U.S. PATENT DOCUMENTS 5,290,738 A * 3/1994 Tomishima ........... C04B 35/462
428/813
5,732,468 A * 3/1998 Galley ................. B23K 1/0018
29/889.1
(Continued)

FOREIGN PATENT DOCUMENTS

EP 2353830 A2 8/2011
WO 2014116529 A1 7/2014

OTHER PUBLICATIONS

CTE values, Nov. 2014, https://web.archive.org/web/20141114120431/http://www.performancecomposites.com/about-composites-technical-info/124-designing-with-carbon-fiber.html.*
(Continued)

*Primary Examiner* — Woody A Lee, Jr.
(74) *Attorney, Agent, or Firm* — Dority & Manning, P.A.

(57) ABSTRACT

An annular rotatable component for a machine includes a first element formed of a composite material, is ring-shaped, and is formed of one or more first ring segments. The first element includes a first interface surface. A second element is formed of a metallic material, is ring-shaped, and is formed of one or more second ring segments. The second element includes a second interface surface complementary to the first interface surface. The annular rotatable component also includes an interface comprising an interface material disposed between the first interface surface and the second interface surface. The interface material, the first element and the second element are co-bonded together to form a unitary structure of the annular rotatable component.

24 Claims, 6 Drawing Sheets

(51) Int. Cl.
  *F01D 5/28* (2006.01)
  *F01D 5/14* (2006.01)
(52) U.S. Cl.
  CPC .............. *F05D 2300/50212* (2013.01); *F05D 2300/603* (2013.01)

(56) References Cited

U.S. PATENT DOCUMENTS

| | | | |
|---|---|---|---|
| 6,071,128 A * | 6/2000 | Brewington | H01L 23/4093 257/E23.086 |
| 6,729,792 B2 | 5/2004 | Pritzer | |
| 8,262,358 B1 * | 9/2012 | Muylaert | B64C 11/06 416/134 A |
| 8,425,192 B2 | 4/2013 | Hoyland et al. | |
| 8,449,260 B2 | 5/2013 | Xie et al. | |
| 8,562,201 B2 * | 10/2013 | Alvarez Rivera | G02B 6/0093 362/612 |
| 8,753,094 B2 * | 6/2014 | Bottome | H01M 2/0235 416/245 R |
| 9,284,842 B2 * | 3/2016 | Lombard | F01D 5/02 |
| 2002/0102160 A1 * | 8/2002 | Breakwell | B64C 11/14 415/219.1 |
| 2004/0082394 A1 * | 4/2004 | Lee | F16C 3/026 464/182 |
| 2006/0280600 A1 * | 12/2006 | Euvino, Jr. | F01D 25/02 415/175 |
| 2010/0258199 A1 | 10/2010 | Schreiber | |
| 2011/0103726 A1 * | 5/2011 | Xie | F01D 5/06 384/295 |
| 2013/0112812 A1 * | 5/2013 | Kismarton | B32B 25/00 244/132 |
| 2013/0202449 A1 | 8/2013 | Lombard et al. | |
| 2014/0003958 A1 * | 1/2014 | Turner | F01D 11/008 416/244 A |
| 2014/0186166 A1 * | 7/2014 | Kostka | F01D 5/143 415/182.1 |
| 2015/0125305 A1 * | 5/2015 | Duelm | F04D 29/023 416/193 A |
| 2016/0159488 A1 * | 6/2016 | Roach | B29D 22/00 416/245 R |
| 2016/0160869 A1 * | 6/2016 | Roach | F04D 29/023 415/200 |
| 2016/0169012 A1 * | 6/2016 | DaCunha | C25D 5/022 416/241 R |
| 2016/0245086 A1 | 8/2016 | Kirkpatrick et al. | |

OTHER PUBLICATIONS

Chinese Office Action Corresponding to Application No. 201810443824 dated Apr. 15, 2020.

Yinghong, Zhong, "Study on thermal barrier coatings of gas turbine blade", Jun. 11, 2015, pp. 1-141.

* cited by examiner

COMPONENT HAVING CO-BONDED COMPOSITE AND METAL RINGS AND METHOD OF ASSEMBLING SAME

BACKGROUND

The field of the disclosure relates generally to gas turbine engines and, more particularly, to a system and method for co-bonding components in a gas turbine engine.

At least some known gas turbine engines include a plurality of rotating components that range in size from large to small. Typically, large rotating components are coupled to small rotating components. One method of coupling components together is to co-bond, or co-mold, the components together. However, at least some components are constructed of different materials with different coefficients of thermal expansion. When the co-bonded components are heated, different coefficients of thermal expansion cause the components to expand at different rates. Uneven expansion causes stress and strain on the co-bonded components.

BRIEF DESCRIPTION

In one aspect, an annular rotatable component for a machine includes a first element formed of a composite material. The first element is ring-shaped and formed of one or more first ring segments. The first element includes a first interface surface. A second element is formed of a metallic material. The second element is ring-shaped and formed of one or more second ring segments. The second element includes a second interface surface complementary to the first interface surface. The component also includes an interface comprising an interface material disposed between the first interface surface and the second interface surface. The interface material, the first element and the second element are co-bonded together to form a unitary structure of the component.

Optionally, the composite material has a first coefficient of thermal expansion and the metallic material has a second coefficient of thermal expansion different than the first coefficient of thermal expansion. The unitary structure of the component may comprise a 360° ring. The second element may comprise a ring having a radius of between ten inches and twenty inches. Optionally, the second element comprises a load bearing rabbet feature. The first element may include a carbon composite material. Also optionally, the component may include a hybrid flange that includes at least a portion of the interface. The hybrid flange may have a thickness wherein the first element forms greater than 40 percent of the thickness. Optionally, the second element forms greater than 40 percent of the thickness. The interface material may include a layer of a rubber material, a layer of a glass fiber material, a layer of film adhesive or structural adhesive, a layer of a glass fabric material, and/or a layer of fibrous ceramic material. Also optionally, the interface material has a third coefficient of thermal expansion different than the first coefficient of thermal expansion and the second coefficient of thermal expansion. The interface may comprise a plurality of layers of different interface materials disposed between the first interface surface and the second interface surface, wherein each interface material of the plurality of layers has a coefficient of thermal expansion different than the first coefficient of thermal expansion and the second coefficient of thermal expansion.

In another aspect, a gas turbine engine assembly includes a core engine including a high pressure compressor, a combustor, and a high pressure turbine in a serial flow arrangement. The gas turbine engine assembly also includes at least one rotatable, load bearing component including a first element formed of a composite material. The first element is ring-shaped and formed of one or more first ring segments. The first element also includes a first interface surface. The gas turbine engine assembly also includes a second element formed of a metallic material. The second element is ring-shaped and formed of one or more second ring segments. The second element includes a second interface surface complementary to the first interface surface. The gas turbine engine assembly further includes an interface that includes an interface material disposed between the first interface surface and the second interface surface. The interface material, the first element and the second element are co-bonded together to form a unitary structure of the component.

Optionally, the composite material has a first coefficient of thermal expansion and the metallic material has a second coefficient of thermal expansion different than the first coefficient of thermal expansion. Also optionally, the interface material has a third coefficient of thermal expansion different than the first coefficient of thermal expansion and the second coefficient of thermal expansion. The unitary structure of the component may be embodied in a 360° ring. Optionally, the second element includes a load bearing rabbet feature. The component may include a hybrid flange that includes at least a portion of the interface. The hybrid flange may have a thickness wherein the first element forms greater than 40 percent of the thickness, and/or the second element forms greater than 40 percent of the thickness. Also optionally, the interface material includes at least one of a layer of a rubber material, a layer of a glass fiber material, a layer of film adhesive or structural adhesive, a layer of a glass fabric material, and a layer of a fibrous ceramic material. The first element may include a carbon composite material.

In yet another aspect, a method of assembling a component for a gas turbine engine includes providing a first element comprising a first material having a first coefficient of thermal expansion, providing a second element comprising a second material having a second coefficient of thermal expansion different than the first coefficient of thermal expansion, providing an interface material comprising a third material having a third coefficient of thermal expansion different than the first coefficient of thermal expansion and the second coefficient of thermal expansion, and co-bonding the first element, the second element, and the interface material to form the component, the interface material disposed between the first element and the second element at their interfaces during a co-bonding manufacturing process and during operating conditions of the component.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 1-6 show example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The following detailed description illustrates embodiments of the disclosure by way of example and not by way of limitation. It is contemplated that the disclosure has general application to a system for co-bonding components in an aircraft engine. As used herein, co-bonding refers to the curing together of two or more elements, of which at least one is fully cured and at least one is uncured. In the example embodiments, a metallic component is considered to be a fully cured element.

Embodiments of the larger co-bonded components described herein create a stronger, load bearing component for a gas turbine engine assembly. The component includes a first element, a second element, and an interface material. The first element, the second element, and the interface material are co-bonded, also referred to as co-molded, together to form a single load bearing, rotating component. The first element is formed of a first material that has a first coefficient of thermal expansion. The second element is formed of a second material that has a second coefficient of thermal expansion. The interface material includes a third material that has a third coefficient of thermal expansion. The first coefficient of thermal expansion is greater than the second coefficient of thermal expansion, such that the first element expands faster than the second element, causing stress and strain on the component. The interface material is disposed between the first element and the second element. The third coefficient of thermal expansion is an intermediate coefficient of thermal expansion between the first coefficient of thermal expansion and the second coefficient of thermal expansion, such that the interface material reduces the stress and strain caused by the difference in thermal expansion between the first and second elements at their interfaces during the co-bonding manufacturing process along with during the operating conditions of the component.

Figure 1:
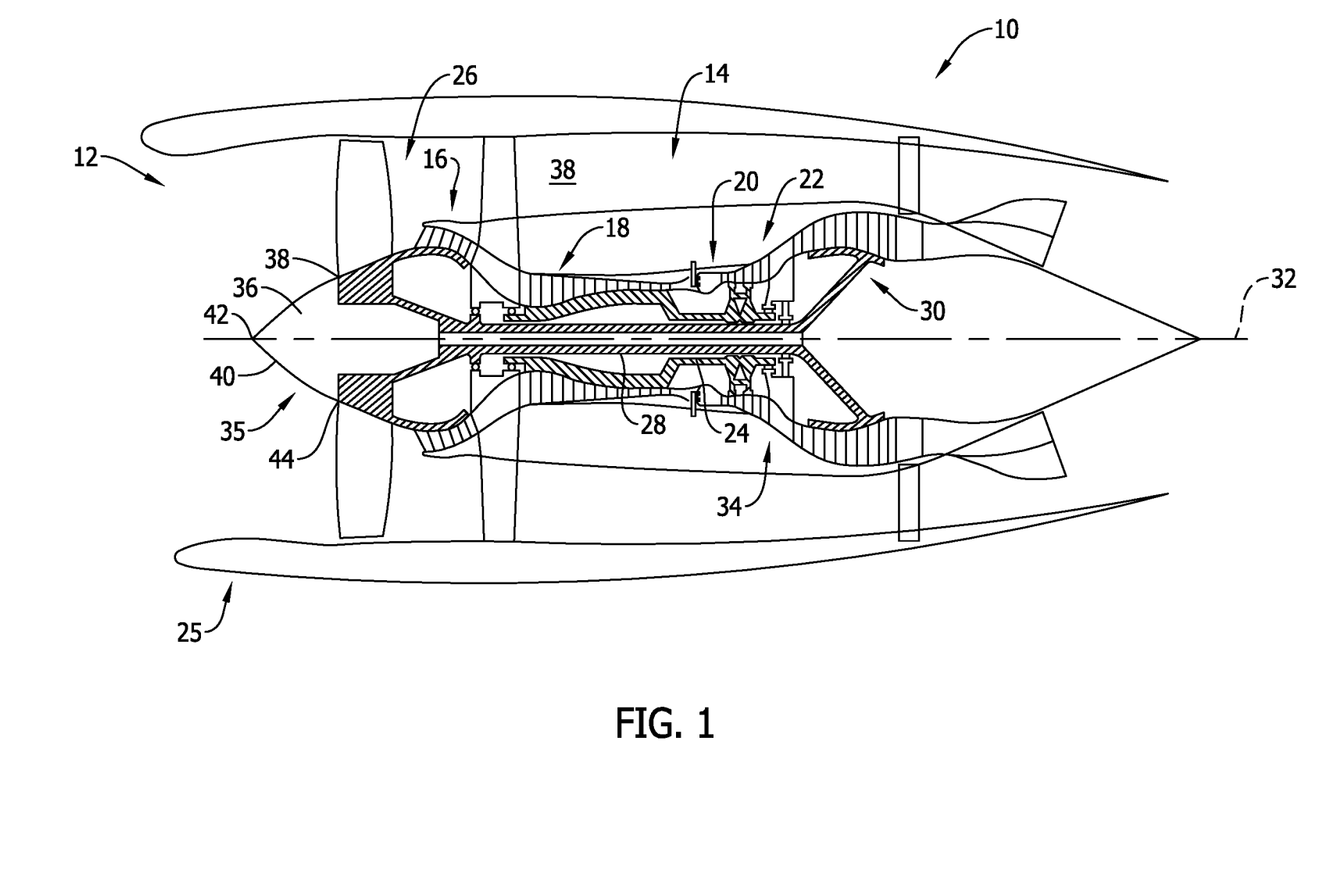
FIG. 1 is a schematic side section view of a gas turbine engine.

FIG. 1 is a schematic side section view of a gas turbine engine 10. Gas turbine engine 10 is shown having an engine inlet opening 12 wherein air enters a core engine 14 which is defined generally by a booster compressor 16, a high pressure compressor 18, a combustor 20 and at least a high pressure turbine 22. Collectively, core engine 14 provides thrust or power during operation. Although gas turbine engine 10 is shown in an aviation embodiment, such an example should not be considered limiting as gas turbine engine 10 may be used for aviation, power generation, industrial applications, marine applications, or the like.

In operation, air enters through engine inlet opening 12 of gas turbine engine 10 and moves through at least one stage of compression where the air pressure is increased and is directed to combustor 20. The compressed air is mixed with fuel and burned providing the hot combustion gas which exits combustor 20 toward high pressure turbine 22. At high pressure turbine 22, energy is extracted from the hot combustion gas, causing rotation of turbine blades which in turn cause rotation of a high pressure shaft 24. High pressure shaft 24 passes toward a forward end 25 of gas turbine engine 10 to drive a rotation of high pressure compressor 18. A fan 26 and, in some embodiments, booster compressor 16, are connected by a low pressure shaft 28 to a low pressure turbine 30, such that fan 26 also creates thrust for gas turbine engine 10. Low pressure turbine 30 may also be utilized to extract further energy and power additional compressor stages. The low pressure air may be used to aid in cooling elements of gas turbine engine 10 as well.

Gas turbine engine 10 is axis-symmetrical about an axis of rotation 32. High pressure shaft 24 extends from forward end 25 to an aft end 34 of gas turbine engine 10 and is journaled by bearings along the length of the shaft structure. High pressure shaft 24 rotates about axis of rotation 32. High pressure shaft 24 may be hollow to allow rotation of low pressure shaft 28 therein, independent of the rotation of high pressure shaft 24. Low pressure shaft 28 also may rotate about axis of rotation 32 of gas turbine engine 10. During operation, low pressure shaft 28 is rotatable along with other structures connected to low pressure shaft 28, such as the rotor assemblies of low pressure turbine 30, in order to create power or thrust for various types of turbines used in power and industrial or aviation areas of use.

At forward end 25, a fan section 35 including a nose cone or spinner 36 is positioned forward of fan 26. Spinner 36 is generally attached to a fan hub in any of a variety of suitable fashions, including but not limited to a number of circumferentially spaced bolts. Spinner 36 provides a smooth flow of air to core engine 14 or radially inner portions of fan 26. Smoothing of the airflow increases efficiency of gas turbine engine 10 and therefore improves performance not only of fan 26, but of downstream elements as well. For example, spinner 36 may be shaped to reduce drag, correct an air velocity profile into core engine 14, reduce an air turbulence into core engine 14, as well as to provide a means for shedding ice and/or deflect foreign objects toward a fan/bypass duct 38 rather than allowing passage through core engine 14. Further, spinner 36 may also absorb impact of foreign objects.

Spinner 36 is generally formed of a conically-shaped sidewall 40 which is generally continuous. Conically-shaped sidewall 40 tapers radially outward from a first end 42 to a larger second end 44. Sidewall 40 may be linear between second end 44 and first end 42. Alternatively, sidewall 40 may be curvilinear between first end 42 and second end 44. As still a further alternative, the geometry of spinner 36 may have varying thickness of features to provide a three-dimensional geometry. Spinner 36 is symmetrical about axis of rotation 32. Spinner 36 is generally hollow to reduce weight and is capable of receiving bolts, fixtures or other elements of the fan hub.

At forward end 25 of gas turbine engine 10, the engine temperatures are lower than in core engine 14, which permits the use of polymer matrix composites (PMC) materials, steel, aluminum, titanium, and the like for spinner 36. Spinner 36 has significant loading requirements. Design characteristics include, for example, aerodynamic loading, high speed revolution fatigue and foreign object strikes.

Exemplary gas turbine engine 10 depicted in FIG. 1 is by way of example only, and in other embodiments, gas turbine engine 10 may have any other suitable configuration. It should also be appreciated, that in still other embodiments, aspects of the present disclosure may be incorporated into any other suitable gas turbine engine. For example, in other embodiments, aspects of the present disclosure may be incorporated into, e.g., a turboprop engine, a turbofan engine, a turboshaft engine, a military style engine, or an aero-derivative engine used in marine-based and land-based applications.

Figure 2:
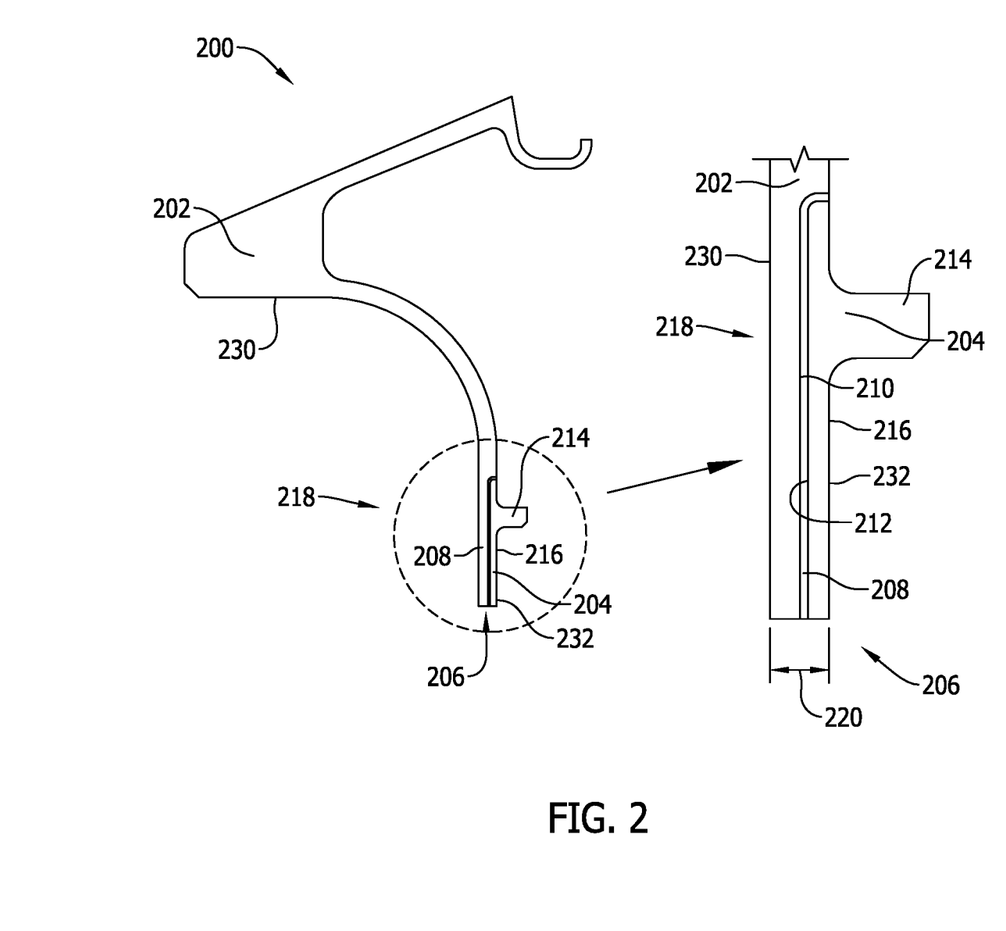
FIG. 2 is a schematic cross-sectional view of an annular rotatable component for a machine.

FIG. 2 is a schematic cross-sectional view of an annular rotatable component 200 for a machine, such as, but not limited to gas turbine engine 10. In various embodiments, annular rotatable component 200 may be embodied in an aft spinner ring for use with spinner 36, a flow path spacer, or other rotatable component such as may be used with gas turbine engine 10 (shown in FIG. 1). Annular rotatable component 200 may include rabbet features as described in more detail below. Annular rotatable component 200 interference fits with adjacent hardware. The rabbet features facilitate reducing leakages, assembly centering, and torque loads transmission. Such features are important for most rotating components in gas turbine engine 10, and non-metallic components formed of, for example, composite materials are not able to provide such features due to strength issues. Consequently, a combination of metallic elements with rabbet features and non-metallic or composite elements are used to form co-bonded annular rotatable component 200 as is described below.

In the example embodiment, annular rotatable component 200 includes a first element 202 formed of a non-metallic or composite material, a second element 204 formed of a metallic material, and an interface 206 comprising an interface material 208. First element 202 is ring-shaped. More specifically, first element 202 is formed from one or more first ring segments 230 (only one of which is visible in the view of FIG. 2) that extend circumferentially to form ring-shaped first element 202. First element 202 includes a first interface surface 210. Second element 204 is also ring-shaped. More specifically, second element 204 is formed from one or more second ring segments 232 (only one of which is visible in the view of FIG. 2) that extend circumferentially to form ring-shaped second element 204. Second element 204 includes a second interface surface 212 complementary to first interface surface 210. Interface 206 includes interface material 208 disposed between first interface surface 210 second interface surface 212. Interface material 208, first element 202 and second element 204 are co-bonded together, for example using a resin transfer molding (RTM) process, to form a unitary structure of annular rotatable component 200.

In one embodiment, the composite material of first element 202 includes a carbon composite material or a carbon fibrous composite material and has a first coefficient of thermal expansion. The metallic material of second element 204 includes, for example, alloys of steel, alloys of aluminum, and alloys including, for example, titanium, nickel chromium and the metallic material has a second coefficient of thermal expansion. In various embodiments, the second coefficient of thermal expansion is different than the first coefficient of thermal expansion. In the exemplary embodiment, the first coefficient of thermal expansion is less than the second coefficient of thermal expansion such that second element 204 expands faster than first element 202 causing stress and strain within annular rotatable component 200 at the interface location.

In the exemplary embodiment, interface material 208 has a third coefficient of thermal expansion different than the first coefficient of thermal expansion and the second coefficient of thermal expansion. For example, interface material 208 includes at least one of a layer of a rubber material, a layer of a glass fiber material, a layer of film adhesive or structural adhesive, a layer of glass fabric material and/or a layer of fibrous ceramic material. In various embodiments, a value of the third coefficient of thermal expansion is between the values of the first coefficient of thermal expansion and the second coefficient of thermal expansion. In one embodiment, the second coefficient of thermal expansion is greater than the first coefficient of thermal expansion such that second element 204 expands faster than first element 202, causing stress and strain on annular rotatable component 200. Interface material 208 is disposed between first element 202 and second element 204. The third coefficient of thermal expansion is an intermediate coefficient of thermal expansion between the first coefficient of thermal expansion and the second coefficient of thermal expansion, such that interface material 208 reduces the stress and strain caused by difference in thermal expansion of first element 202 and second element 204.

In the exemplary embodiment, annular rotatable component 200 includes a hybrid flange 218 that includes at least a portion of interface 206. In addition, second element 204 includes a load bearing rabbet feature 214 extending outwardly from a surface 216 of hybrid flange 218. Rabbet feature 214 is configured to align and support annular rotatable component 200 within gas turbine engine 10. Hybrid flange 218 includes a thickness 220. In some embodiments, first element 202 forms greater than 40 percent of thickness 220. Additionally or alternatively, second element 204 forms greater than 40 percent of thickness 220. In various other embodiments, each of first element 202 and second element 204 form any suitable percentage of thickness 220.

During operation, annular rotatable component 200 expands because of heat generated by gas turbine engine 10. First element 202, second element 204, and interface material 208 all expand at different rates because each has a different coefficient of thermal expansion. However, interface material 208 reduces the stress and strain generated by the different expansion rates because interface material 208 has a coefficient of thermal expansion between the first coefficient of thermal expansion and the second coefficient of thermal expansion. As such, interface material 208 expands at a rate between first element 202 and second element 204 and reduces the stress and strain on annular rotatable component 200. This interface material also helps to reduce the thermal residual stresses in annular rotatable component 200 during the co-bonding manufacturing process. Additionally, co-bonding annular rotatable component 200 eliminates the need for a thick intermediate flange and reduces the weight of annular rotatable component 200.

Figure 3:
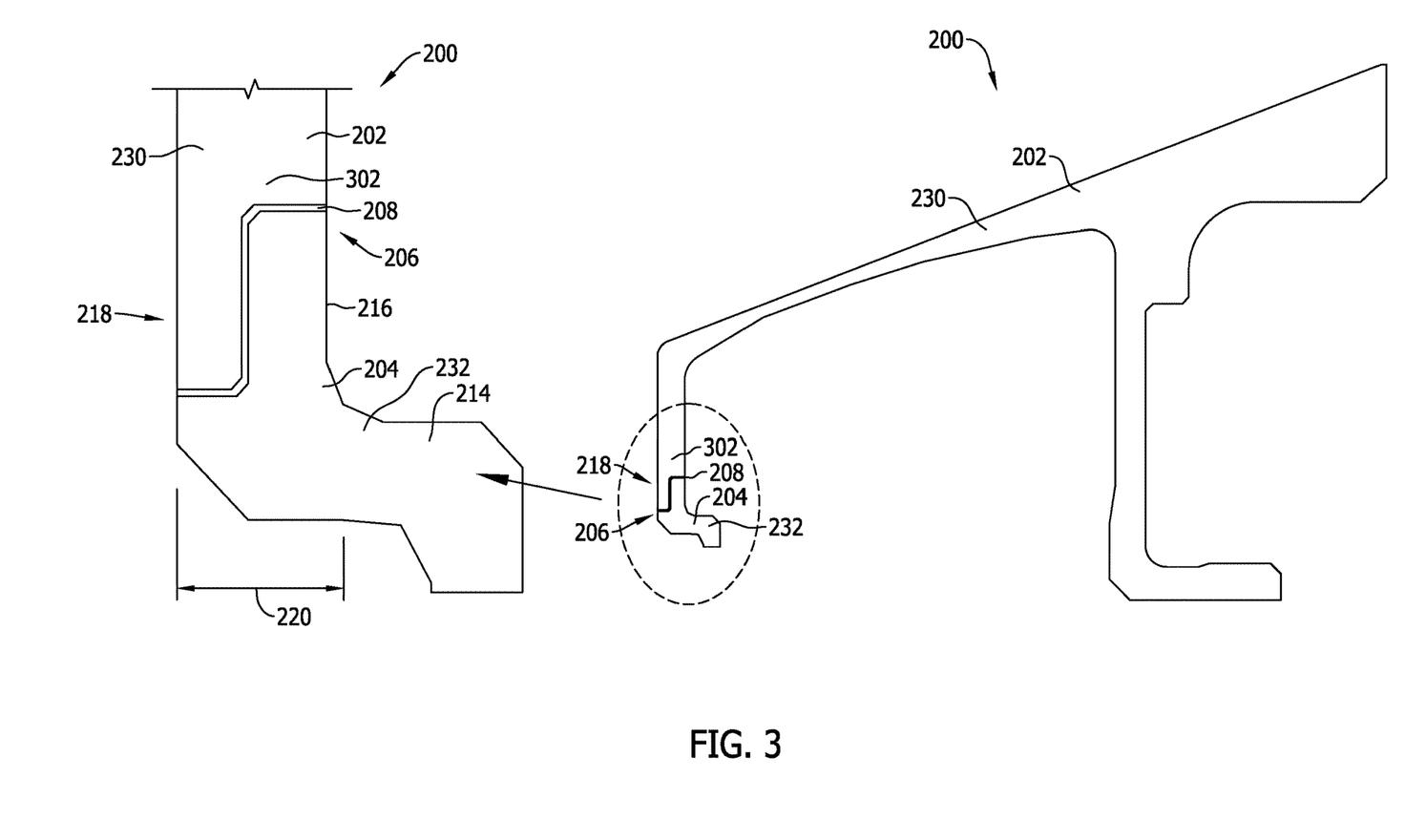
FIG. 3 is a schematic cross-sectional view of another embodiment of the component.

FIG. 3 is a schematic cross-sectional view of another embodiment of annular rotatable component 200. In the example embodiment of FIG. 3, second element 204 is connected to a distal end 302 of first element 202. Annular rotatable component 200 still includes hybrid flange 218, rabbet feature 214, and interface 206.

Figure 4:
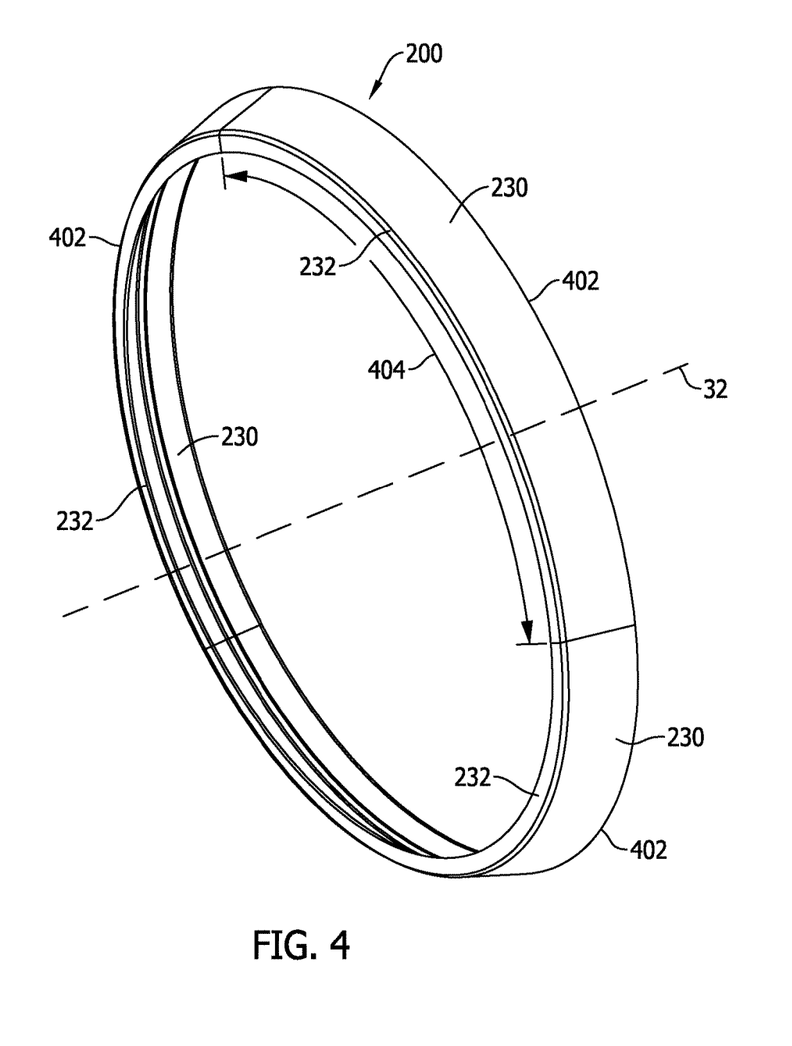
FIG. 4 is a perspective view of the component embodied as an aft spinner ring that may be used with spinner shown in FIG. 1.

FIG. 4 is a perspective view of annular rotatable component 200 embodied as, for example, an aft spinner ring that may be used with spinner 36 (shown in FIG. 1). In one embodiment, the unitary structure of annular rotatable component 200 is embodied in a 360° ring configured to circumscribe an axis of rotation 32 or centerline of the machine, for example, gas turbine engine 10. The unitary structure of annular rotatable component 200 may be assembled from a number of ring segments 402 that each cover a respective arc 404 of annular rotatable component 200 to form a 360° ring. For example, three ring segments 402, as is shown in FIG. 4, would each cover approximately 120° of the full 360° span of annular rotatable component 200. However, the unitary structure of annular rotatable component 200 may be assembled from any number of ring segments 402 that allow annular rotatable component 200 to perform as described herein. In some embodiments, ring segments 402 are not equally-sized arcs, but rather each ring segment 402 could be of a different arc span. With reference also to FIG. 2, in some embodiments, each component ring segment 402 is assembled from at least one of first ring segments 230 coupled to at least one of second ring segments 232 at interface 206. For example, each of first ring segments 230 may be coupled to at least one of second ring segments 232 prior to joining first ring segments 230 to each other to form first element 202, and/or prior to joining second ring segments 232 to each other to form second element 204. Alternatively, at least one of first element 202 and second element 204 may be assembled separately, prior to coupling any of first ring segments 230 to second ring segments 232.

Figure 5:
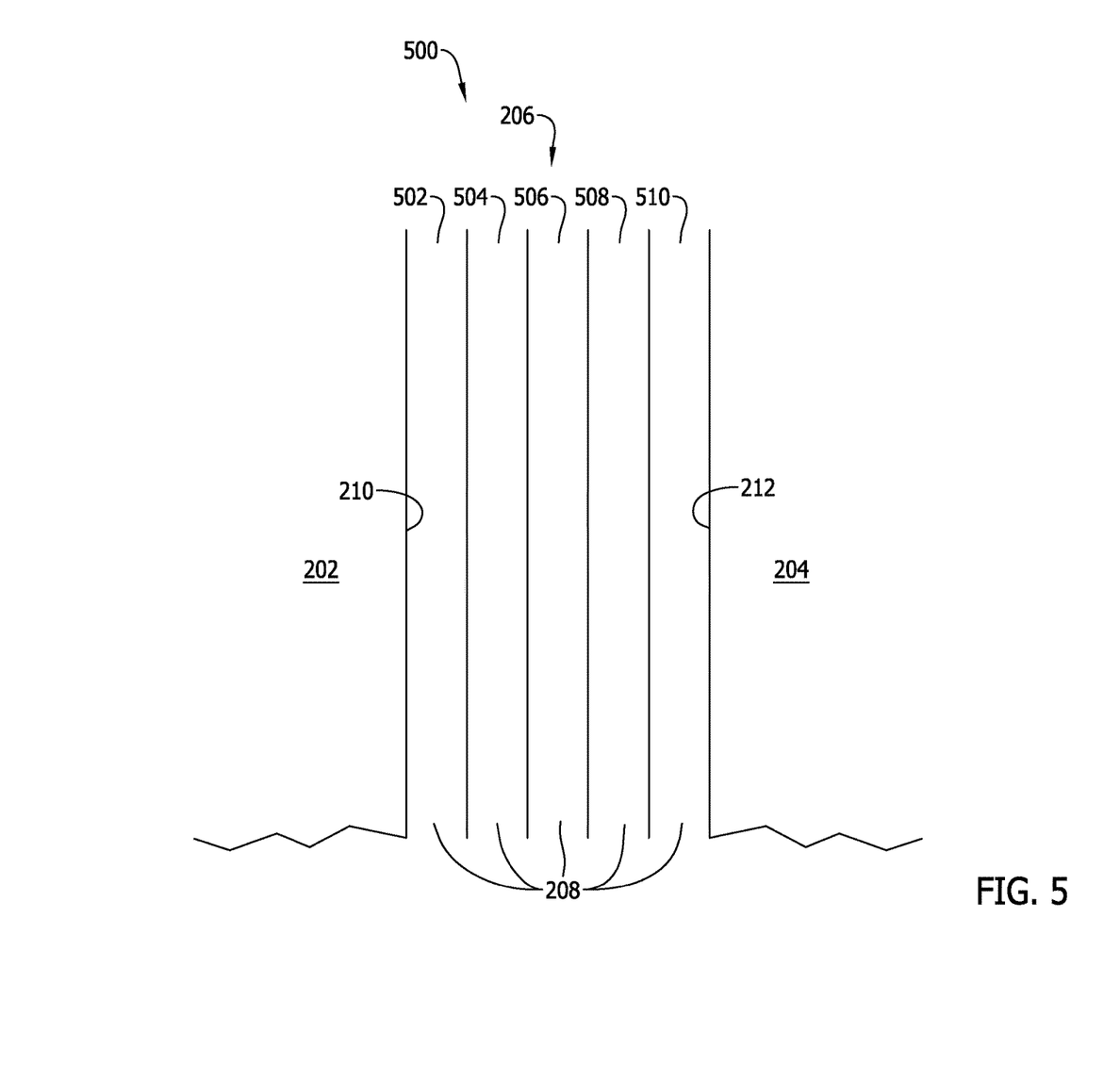
FIG. 5 is an expanded view of an interface of the component including a plurality of layers of interface material.

FIG. 5 is an expanded view of interface 206 and a plurality of layers 500 of interface material 208 having a gradient coefficient of thermal expansion (CTE). Because first element 202 and second element 204 have different coefficients of thermal expansion, when joined together an amount of stress and strain are built up in interface 206 when annular rotatable component 200 is changing temperature. To reduce the reduce thermomechanical stress at interface 206, so as to, for example, improve the life of annular rotatable component 200, one or more layers 500 of interface material 208, illustrated by way of example as five layers 502, 504, 506, 508, and 510, may be used between first element 202 and second element 204. Each of the boundaries or joints between adjacent layers 502, 504, 506, 508, and 510 and between first element 202 and layer 502 and between second element 204 and layer 510 can each be individually considered as intermediate interfaces between layers of different interface materials having smaller differences of coefficient of thermal expansion between them. Such stacking of coefficient of thermal expansion between first element 202 and second element 204 further reduces the stress and strain caused by varying temperature in annular rotatable component 200.

For example, if first element 202 and second element 204 had coefficients of thermal expansion that differed by a large amount, a large amount of stress and strain during temperature excursions would be expected at a direct interface between them. However, with multiple joints between stacked layers 500 of interface material 208, a smaller amount of stress and strain would be expected between each of layers 502, 504, 506, 508, and 510 lowering the total stress and strain between first element 202 and second element 204.

As used herein, the CTE gradient refers to a plurality of CTE's, the plurality of CTE's incrementally increasing or decreasing between first element 202 and second element 204. The CTE's of adjacent layers 502, 504, 506, 508, and 510 are selected to reduce the shear force and displacement at the surfaces of first element 202 and second element 204 due to the thermal expansivity mismatch, increasing reliability at the interconnection members.

Figure 6:
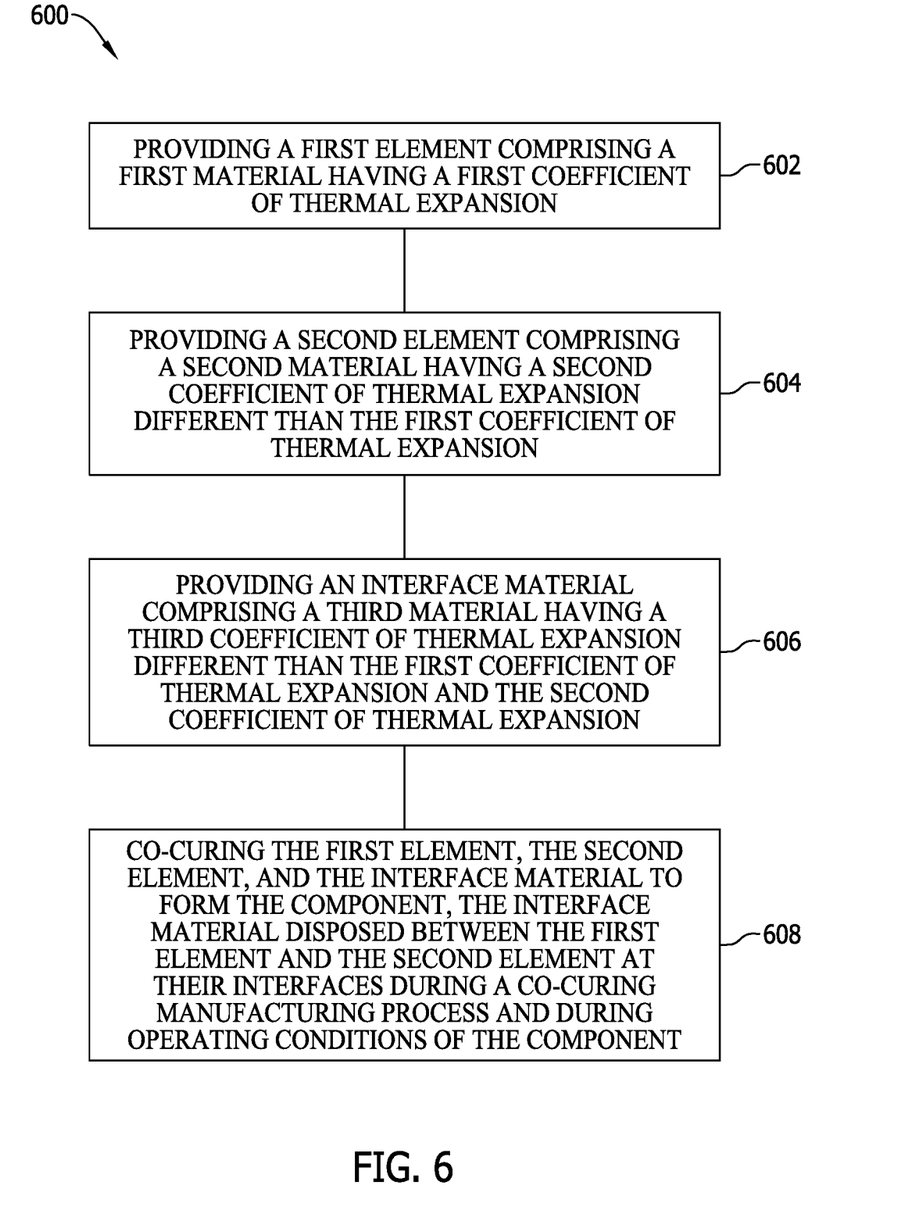
FIG. 6 is a method of assembling a component for the gas turbine engine shown in FIG. 1.

FIG. 6 is a flowchart of a method 600 of assembling a component for gas turbine engine 10 (shown in FIG. 1). In the example embodiment, method 600 includes providing 602 a first element comprising a first material having a first coefficient of thermal expansion and providing 604 a second element comprising a second material having a second coefficient of thermal expansion different than the first coefficient of thermal expansion. Method 600 also includes providing 606 an interface material comprising a third material having a third coefficient of thermal expansion different than the first coefficient of thermal expansion and the second coefficient of thermal expansion, and co-bonding 608 the first element, the second element, and the interface material to form the component, the interface material disposed between the first element and the second element at their interfaces during a co-bonding manufacturing process and during operating conditions of the component.

The above-described co-bonded components provide an efficient method for forming a strong, rotating component within a gas turbine engine. The component includes a first element, a second element, and an interface material. The first element, the second element, and the interface material are co-bonded together to form a single load bearing, rotating component. The first element is formed of a first material that has a first coefficient of thermal expansion. The second element is formed of a second material that has a second coefficient of thermal expansion. The interface material includes a third material that has a third coefficient of thermal expansion. The second coefficient of thermal expansion is greater than the first coefficient of thermal expansion such that the second element expands faster than the first element in response to rising temperature, causing stress and strain on the component. The interface material is disposed between the first element and the second element. The third coefficient of thermal expansion is an intermediate coefficient of thermal expansion between the first coefficient of thermal expansion and the second coefficient of thermal expansion, such that the interface material reduces the stress and strain caused by difference in thermal expansion.

Exemplary embodiments of the co-bonded components are described above in detail. The co-bonded components, and methods of forming such systems and devices, are not limited to the specific embodiments described herein, but rather, elements of systems and/or steps of the methods may be utilized independently and separately from other elements and/or steps described herein. For example, the methods may also be used in combination with other systems requiring elements with different coefficients of thermal expansion, and are not limited to practice with only the systems and methods as described herein. Rather, the exemplary embodiment can be implemented and utilized in connection with many other machinery applications that are currently configured to receive and accept elements with different coefficients of thermal expansion.

Example methods and apparatus for co-bonded components are described above in detail. The apparatus illustrated is not limited to the specific embodiments described herein, but rather, elements of each may be utilized independently and separately from other elements described herein. Each system element can also be used in combination with other system elements.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An annular rotatable component for a machine, said annular rotatable component comprising:
    a first element formed of a non-metallic material, said first element is ring-shaped and formed of one or more first ring segments, said first element comprising a first interface surface;
    a second element formed of a metallic material, said second element is ring-shaped and formed of one or more second ring segments, said second element comprising a second interface surface complementary to said first interface surface; and
    an interface comprising an interface material disposed between said first interface surface and said second interface surface, said interface material, said first element and said second element co-bonded together to form a unitary structure of said annular rotatable component;
    wherein said non-metallic material has a first coefficient of thermal expansion and said metallic material has a second coefficient of thermal expansion different than the first coefficient of thermal expansion;
    wherein said interface material has a gradient coefficient of thermal expansion.

2. The annular rotatable component of claim 1, wherein said interface material has a third coefficient of thermal expansion having a value between a value of the first coefficient of thermal expansion and a value of the second coefficient of thermal expansion.

3. The annular rotatable component of claim 1, wherein said interface comprises a plurality of layers of different interface materials disposed between said first interface surface and said second interface surface, each interface material of said plurality of layers of different interface materials has a coefficient of thermal expansion different than the first coefficient of thermal expansion and the second coefficient of thermal expansion.

4. The annular rotatable component of claim 1, wherein said interface comprises a plurality of layers of different interface materials disposed between said first interface surface and said second interface surface.

5. The annular rotatable component of claim 1, wherein said interface comprises a plurality of layers of different interface materials disposed between said first interface surface and said second interface surface, a coefficient of thermal expansion of each of the layers selected to reduce the shear force and displacement at said first interface surface and said second interface surface caused by a thermal expansivity mismatch.

6. The annular rotatable component of claim 1, wherein said second element comprises a load bearing rabbet feature.

7. The annular rotatable component of claim 1, wherein said first element comprises a carbon composite material.

8. The annular rotatable component of claim 1, further comprising a hybrid flange that includes at least a portion of said interface.

9. The annular rotatable component of claim 8, wherein said hybrid flange comprises a thickness, said first element comprises greater than 40 percent of the thickness.

10. The annular rotatable component of claim 8, wherein said hybrid flange comprises a thickness, said second element comprises greater than 40 percent of the thickness.

11. The annular rotatable component of claim 1, wherein said interface material comprises at least one of a layer of a rubber material, a layer of a glass fiber material, a layer of film adhesive or structural adhesive, a layer of glass fabric material, and a layer of fibrous ceramic material.

12. The annular rotatable component of claim 1, wherein said second element comprises a ring having a radius of between ten inches and twenty inches.

13. A gas turbine engine assembly comprising:
    a core engine comprising a high pressure compressor, a combustor, and a high pressure turbine in a serial flow arrangement;
    at least one rotatable, load bearing component, said load bearing component comprising:
    a first element formed of a composite material, said first element is ring-shaped and formed of one or more first ring segments, said first element comprising a first interface surface;
    a second element formed of a metallic material, said second element is formed of a shape that is complementary to a shape of said first element and formed of one or more second ring segments, said second element comprising a second interface surface complementary to said first interface surface; and
    an interface comprising an interface material disposed between said first interface surface and said second interface surface, said interface material, said first element and said second element co-bonded together to form a unitary structure of said load bearing component;
    wherein said composite material has a first coefficient of thermal expansion and said metallic material has a second coefficient of thermal expansion different than the first coefficient of thermal expansion;
    wherein said interface material has a gradient coefficient of thermal expansion.

14. The gas turbine engine assembly of claim 13, wherein said interface material has a third coefficient of thermal expansion having a value between a value of the first coefficient of thermal expansion and a value of the second coefficient of thermal expansion.

15. The gas turbine engine assembly of claim 13, wherein said second element comprises a load bearing rabbet feature.

16. The gas turbine engine assembly of claim 13, further comprising a hybrid flange that includes at least a portion of said interface.

17. The gas turbine engine assembly of claim 16, wherein said hybrid flange comprises a thickness, said hybrid flange characterized by at least one of (i) said first element comprising greater than 40 percent of the thickness, and (ii) said second element comprising greater than 40 percent of the thickness.

18. The gas turbine engine assembly of claim 13, wherein said interface material comprises at least one of a layer of a rubber material, a layer of a glass fiber material, a layer of film adhesive or structural adhesive, a layer of glass fabric material, and a layer of fibrous ceramic material.

19. The gas turbine engine assembly of claim 13, wherein said first element comprises a carbon composite material.

20. A method of assembling a component for a gas turbine engine, said method comprising:
providing a first element comprising a non-metallic material having a first coefficient of thermal expansion, said first element being ring-shaped and formed of one or more first ring segments, said first element comprising a first interface surface;
providing a second element comprising a metallic material having a second coefficient of thermal expansion different than the first coefficient of thermal expansion, said second element being ring-shaped and formed of one or more second ring segments, said second element comprising a second interface surface complementary to said first interface surface;
providing an interface comprising an interface material that has a gradient coefficient of thermal expansion; and
co-bonding the first element, the second element, and the interface material to form the component, the interface material disposed between the first element and the second element at their interfaces during a co-bonding manufacturing process and during operating conditions of the component.

21. The method of claim 20, wherein said interface comprises a plurality of layers of different interface materials disposed between said first interface surface and said second interface surface, a coefficient of thermal expansion of each of the layers selected to reduce the shear force and displacement at said first interface surface and said second interface surface caused by a thermal expansivity mismatch.

22. The method of claim 20, wherein said second element comprises a load bearing rabbet feature.

23. The method of claim 20, wherein said first element comprises a carbon composite material.

24. The method of claim 20, wherein said interface material comprises at least one of a layer of a rubber material, a layer of a glass fiber material, a layer of film adhesive or structural adhesive, a layer of glass fabric material, and a layer of fibrous ceramic material.

* * * * *